June 27, 1967 E. P. KOLLAR 3,328,563

OPTICAL COINCIDENCE READOUT IN INFORMATION STORAGE AND RETRIEVAL

Filed Dec. 21, 1962

2 Sheets-Sheet 1

INVENTOR
ERNEST P. KOLLAR
BY Francis V. Giolma
ATTORNEY

United States Patent Office 3,328,563

Patented June 27, 1967

3,328,563

OPTICAL COINCIDENCE READOUT IN INFORMATION STORAGE AND RETRIEVAL

Ernest P. Kollar, Vestal, N.Y., assignor to International Business Machines Corporation, New York, N.Y., a corporation of New York Filed Dec. 21, 1962, Ser. No. 246,525
2 Claims. (Cl. 235—61.11)

The present invention relates generally to information retrieval, and it has reference in particular to optical coincidence readout in information storage and retrieval.

Generally stated, it is an object of the present invention to use perforated address keyword cards of a radiation transmitting material in a peek-a-boo optical coincidence card information retrieval system so that a plurality of choices of documents may be made in accordance with descending orders of coincidence of address perforations.

More specifically, it is an object of this invention to provide for using translucent cards in a keyword card optical coincidence information retrieval system, with the cards having a density such that a maximum differential between the light transmitted for a plurality of different keyword addresses may be readily ascertained.

Another object of this invention is to provide for likewise utilizing aperture keyword cards in a peep-a-boo information retrival system having sufficiently translucent portions so that a plurality of degrees of coincidence of addresses may be readily ascertained.

Yet another object of the invention is to provide for using a polyester card material having a density from .50 to .01 for keyword cards in an optical coincidence information retrival system so that from two to twenty cards can be stacked, and several different degrees of coincidence of address locations punched therein can be readily ascertained.

It is also an object of this invention to provide a simpler over-all operation in selecting keyword addresses in an optical coincidence information retrieval system.

Another object of the invention is to utilize translucent keyword cards having perforated address portions relating to documents in stacked relation with a light source so that an analog display of relative values of light transmission through the perforated and unperforated address portions may be observed and utilized in making first, second, third, etc. choice of documents.

Another important object of the invention is to provide a simple and effective method of producing an analog display of light transmission through translucent keyword cards in an information retrieval system so as to facilitate multiple choice selection of documents.

While optical coincidence or peep-a-boo information retrieval systems are well known, it will be realized that complete coincidence of document address perforations on a plurality of keyword cards does not always necessarily result in the best answer. Because of different usages of terms and variations in meanings, it may often be desirable to make a second, third or possibly fourth choice of documents in descending orders of coincidence.

By experience it has been determined that in a keyword information retrieval system seldom are more than twelve or thirteen cards involved and in most instances, fewer are utilized. The average appears to range from five to seven cards. It is therefore possible by using translucent keyword cards to not only determine complete coincidence of an address location, but also several near coincidence conditions, so as to readily select second, third and fourth, etc. choices of documents relating to the desired keywords.

In a preferred embodiment of the invention, a plurality of keyword cards used in an analog optical coincidence or peep-a-boo information retrieval system are made of a polyester material having an optical density of about .045 to permit analog determination of near coincidence as well as complete coincidence. These cards are filed in the usual alphabetic order and each pertains to a keyword which forms a part of the subject to be searched. The cards each have one or more address perforations at different coordinate positions thereon identifying the addresses of documents in a file of documents relating to the particular keyword.

The cards are stacked in aligned relation, and light is applied to one side of the stack. Complete coincidence of the same address perforation on every card can be readily ascertained by the intensity of the light shining through aligned address perforations in the usual manner. Because the cards are translucent, different degrees of near coincidence may also be readily ascertained by observing or measuring the different intensities of the light transmitted at such other address locations where different numbers of but less than all the cards have aligned address perforations and hence second, third, etc. choices of documents may be made from observing the corresponding intensities of light transmitted at address location where near but not complete coincidence is obtained.

The foregoing and other objects, features and advantages of the invention will be apparent from the following more particular description of a preferred embodiment of the invention as illustrated in the accompanying drawings.

Figure 1:
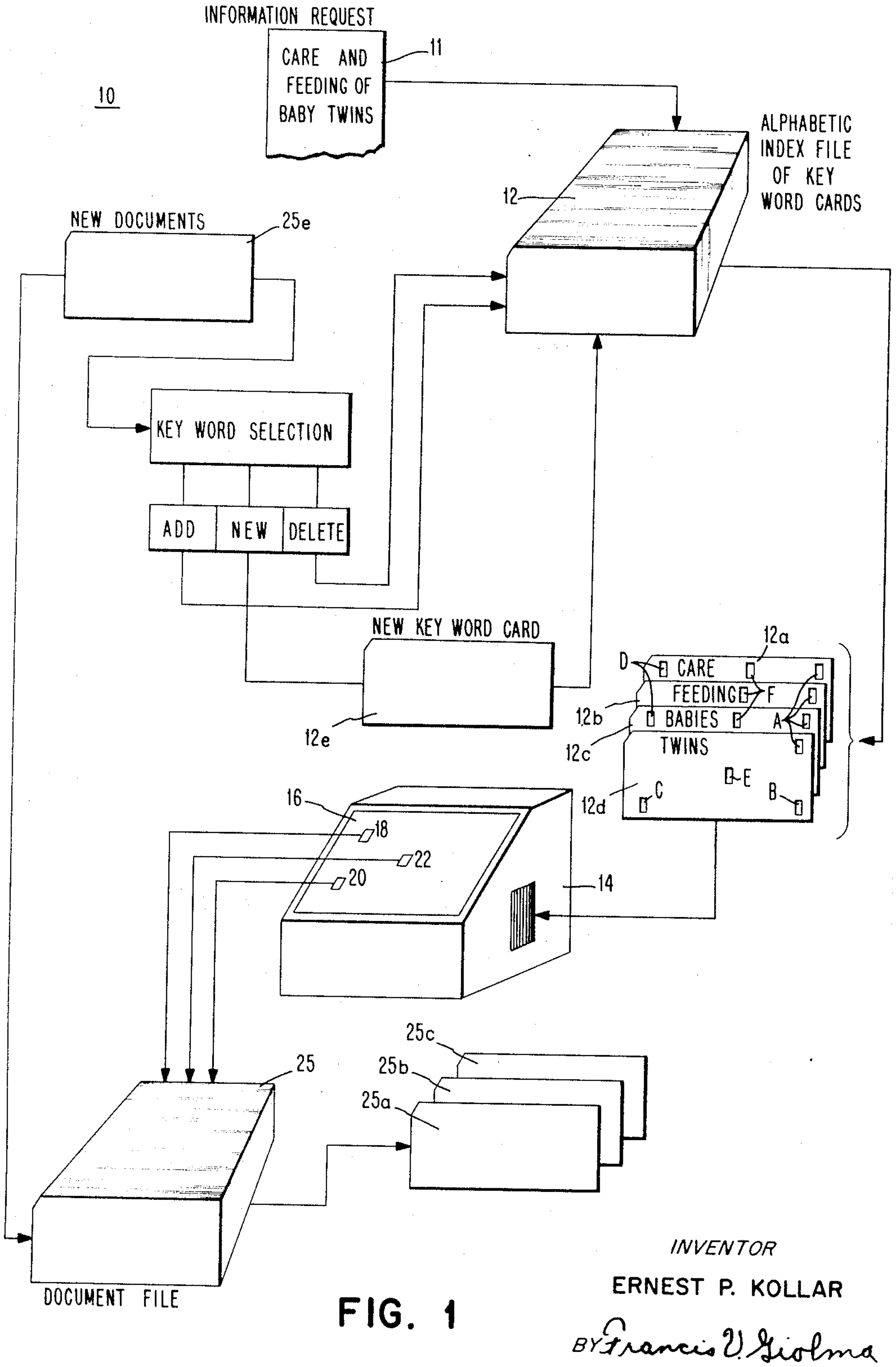
FIG. 1 is a schematic diagram of an information retrieval system utilizing optical coincidence readout.

Referring to FIG. 1, the reference numeral 10 designates generally an optical coincidence readout system in which a request for information 11 concerning for example the Care and Feeding of Baby Twins is to be processed. In response to such a request 11, a plurality of translucent keyword cards such as 12*a* through 12*d* may be pulled from an alphabetic index file of keyword cards 12. These cards have a plurality of perforations such as the perforations A–D located at predetermind coordinate positions therein and representative of the addresses of documents relating to the subject matter of the different keywords. These cards may be placed in a viewer 14 and subjected to illumination so as to project on the screen 16 images of coincident and/or near coincident address locations. From this information as observed on the screen 16, documents may be pulled from the indicated address location of a document file 25, and each of these documents 25*a*, 25*b*, etc. should relate to the subject matter of the keyword cards 12*a* through 12*d*, and hence provide the desired information.

The document file 25 may as shown be implemented by new documents from time to time such as the document 25*c*, and the alphabetic index of keyboard cards 12 may be updated such as by adding address locations of the new document to cards presently in the file 12, adding new keyword cards such as the card 12*e*, relating to different keyboards, and possibly deleting some of the keyword cards presently in the file.

Figures 2, 3, 4:
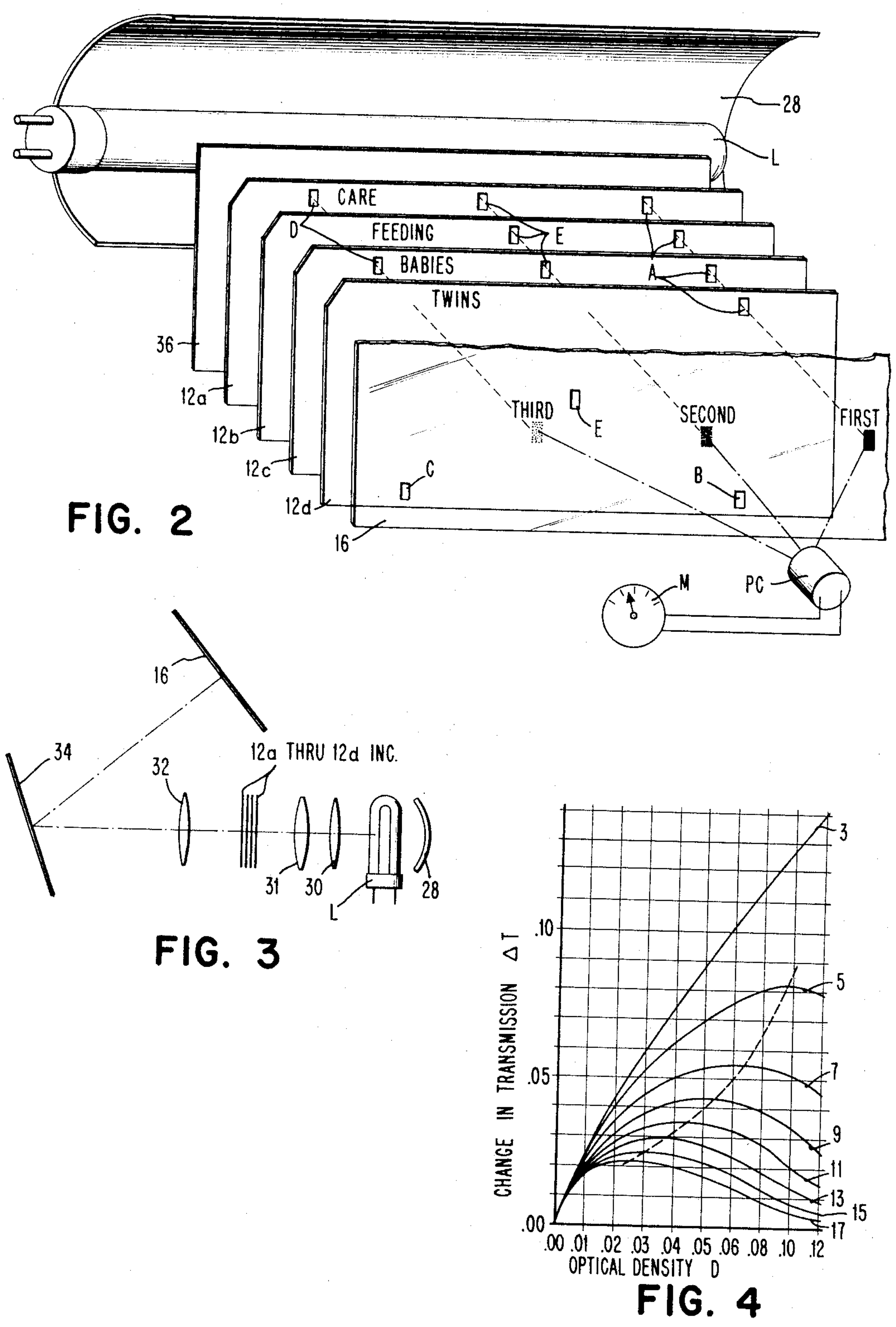
FIG. 2 is an enlarged isometric view of a portion of the optical coincidence system of FIG. 1 showing an application of the invention in one of its forms.
FIG. 3 is a schematic diagram of an optical system which may be utilized in the system of FIG. 1 in practicing the invention.
FIG. 4 shows a plurality of curves illustrating the variation in light transmission with different numbers of translucent cards for different values of optical density thereof.

In order to provide for making more than one selection of documents which may for example be predicted on complete coincidence of address locations in the plurality of cards 12*a* through 12*d*, such as for example the address location 1 indicated on the cards in FIG. 2, the cards 12*a* through 12*d* etc. may be of the standard IBM size 7⅜ x 3¼ and 5 to 10 mils thick, and made of a translucent material such as a polyester film or sheet material having an optical density ranging from .01 to .50, and preferably having an optical density on the order of .045. The address perforations A–F may be of the standard IBM size (⅛ x 1/16 in.), square and approximately ⅛ x ⅛ in., or round and about ⅛ in. diameter. When the cards of this nature are aranged in stacked relation and subjected to light from a light source L, in conjunction with a diffused plate 36, the cards transmit sufficient light so that not only can complete coincidence be observed, as for example the coincidence of perforations *a* in each of the four cards, but also near coincidence of other address locations may be readily observed. For example, the coincidence of address locations *f* in the cards 12*a*, 12*b* and 12*c* may be readily observed on the screen 16 even though no perforation appears at the corresponding location in the card 12*d*. Likewise, a third choice of addresses may be made by observing the near coincidence of the addresses in the cards 12*a* and 12*c* at, for example, address location *d* even though no such address perforation appears in the cards 12*b* and 12*d*. Correspondingly, a fourth choice may be made such as the address location *e* appearing in the card 12*d* only. The order of selection of addresses may be readily observed either by eye or directly by means of a photoelectric device PC in connection with a meter M. The varying intensity of the image on the screen 16 may even be readily observed by eye and is indicative of the order of choice.

Referring to FIG. 3, a typical optical system such as may be used in connection with the projector or viewer 14 is shown. Means such as a lamp L may be used in connection with a reflecting mirror 28 for projecting light through condensing lenses 30 and 31, through a stack of keyword cards 12*a* through 12*d*, and thence through an object lens 32, whence the image may be reflected from a mirror 34 onto the screen 16 where it may be observed either by eye or by means such as the photocell and meter shown in FIG. 2.

FIG. 4 shows a plurality of numbered curves illustrating the change in transmission of light for the given number of cards relative to the optical density of the material. From these curves it will be observed that a maximum change in transmission occurs for each different number of cards throughout the range of optical densities from approximately .020 to .12 and this indicates the preferred range of density of the cards in the present arrangement.

The curves in FIG. 4 show that a maximum value of light transmission occurs for each of the curves numbered 5 through 17 and representing stacks of 5 through 17 cards, and this indicates a preferred range of optical density to be used for such number of cards. The optical density D of the cards or translucent bits is defined as the logarithm of $1/T$ where T is the percentage of optical transmission.

The curves of FIG. 4 were obtained by substituting different values in the equation:

$$10^{2nE_D D}+2C10^{n(D+E_D D)}-10^{D+E_D D}=0$$

where $n$=number of bits or cards
$E_D$=maximum fractional error in optical density of the cards (a value of .004 may be used as typical)
$\Delta T$=change in transmission from $n$ to $n$-1 bits or cards
$C$=constant error in readouts caused by variations in equipment and bit distribution (an average value for C is .01)

Stacks of cards of controlled translucent film or sheet materials having optical densities on the order of .035 to .055, for example, polyester materials such as Kodapak II, Kodacel A29, Kronar and a polycarbonate material such as Lexan have been tested, using a Texas Instruments IN 2175 photocell, with excellent radiation transmission results, particularly in the visible or near infrared end of the spectrum ranging from 750 to 1100 millimicrons.

From the above description and accompanying drawings it will be apparent by utilizing translucent keyword cards with perforated document addresses in an optical coincidence information retrieval system, a plurality of choices of documents may readily be made. While translucent cards having coordinate located perforations are shown and described, it will be realized that aperture cards may also be used with a translucent background and clear address areas in which actual information may be microfilmed and read from. Since different uses of terms and variations in the meanings may often make it desirable to make a second, third or possibly fourth choice in the selecting of documents relating to different keyword subjects, the invention is highly beneficial for its makes this readily possible. By utilizing translucent keyword cards it is not only possible to determine complete coincidence of address locations in the usual manner, but it is also readily possible to obtain multiple choices of address relating to different keyword subjects.

While the invention has been particularly shown and described with reference to a preferred embodiment thereof it will be understood by those skilled in the art that various changes in form, and details may be made without departing from the spirit and scope of the invention.

What is claimed is:

1. In an analog optical coincidence information retrieval system wherein a plurality of documents in storage each have a different predetermined address.

(a) a stack of translucent keyword cards of a polyester material having an optical density between .02 and .1 and each representing a different keyword relating to information to be retrieved and having at predetermined coordinate locations therein perforations corresponding to the addresses of documents to which the keyword pertains, (b) a light source disposed on one side of said stack arranged to illuminate said one side of said stack uniformly with a beam of substantially parallel light rays between 700–1100 millimicrons, (c) means including a light sensitive device and indicating means for scanning the other side of the stack to ascertain the relative intensity of the light passing through the stack at said predetermined coordinate address locations.

2. In an analog optical coincidence information retrieval system, (a) a plurality of keyword aperture cards of a polyester material having an optical density between .04 and .05 arranged in stacked relation, each of said cards having an address matrix thereon with relatively transparent address spots on a translucent matrix area at predetermined ones of said address locations which correspond to known location of documents relating to said keyword, (b) a radiation source for projecting a substantially parallel beam of radiation against one side of the stack, and (c) means responsive to radiations between 700–1100 millimicrons for determining the relative intensity of the radiation at the other side of the stack at said different address locations.

References Cited

UNITED STATES PATENTS 2,605,965 8/1952 Shepherd -------- 235—61.115

3,064,519 11/1962 Shelton ----------- 340—146.3
3,186,111 6/1965 Lawlor --------------- 35—17

OTHER REFERENCES

Page 3, June 1958, IBM Technical Disclosure Bulletin, vol. I, No. I.

DARYL W. COOK, *Acting Primary Examiner.*

JOHN F. MILLLER, MAYNARD R. WILBUR, *Examiners.*

G. MAIER, *Assistant Examiner.*